(12) United States Patent
Kurosaki et al.

(10) Patent No.: US 11,056,724 B2
(45) Date of Patent: Jul. 6, 2021

(54) POWER STORAGE SYSTEM

(71) Applicant: Panasonic Intellectual Property Management Co., Ltd., Osaka (JP)

(72) Inventors: Yuta Kurosaki, Osaka (JP); Takahiro Kamikawa, Osaka (JP); Etsushi Aga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 186 days.

(21) Appl. No.: 16/316,366

(22) PCT Filed: Aug. 21, 2017

(86) PCT No.: PCT/JP2017/029701
§ 371 (c)(1),
(2) Date: Jan. 9, 2019

(87) PCT Pub. No.: WO2018/038024
PCT Pub. Date: Mar. 1, 2018

(65) Prior Publication Data
US 2019/0312315 A1 Oct. 10, 2019

(30) Foreign Application Priority Data
Aug. 26, 2016 (JP) .............................. JP2016-166216

(51) Int. Cl.
*H01M 10/42* (2006.01)
*H01M 10/44* (2006.01)
(Continued)

(52) U.S. Cl.
CPC ..... *H01M 10/4207* (2013.01); *H01M 10/441* (2013.01); *H01M 10/48* (2013.01);
(Continued)

(58) Field of Classification Search
CPC .................................................. H01M 10/441
See application file for complete search history.

(56) References Cited

U.S. PATENT DOCUMENTS

| 2011/0300415 A1 | 12/2011 | Kumagai et al. | |
| 2013/0202930 A1* | 8/2013 | Kumagai | H01M 10/4207 429/91 |

(Continued)

FOREIGN PATENT DOCUMENTS

| JP | 2011-259545 | 12/2011 | |
| WO | WO-2016114115 A1 * | 7/2016 | ........... H01M 10/425 |
| WO | WO-2016114116 A1 * | 7/2016 | ............. H02J 7/0014 |

OTHER PUBLICATIONS

International Search Report of PCT application No. PCT/JP2017/029701 dated Sep. 12, 2017.

*Primary Examiner* — Robert S Carrico
(74) *Attorney, Agent, or Firm* — McDermott Will and Emery LLP

(57) ABSTRACT

In a power storage system, each of a plurality of power storage modules includes at least one cell, and the plurality of power storage modules are connected in series. A management device manages the plurality of power storage modules. Each of the plurality of power storage modules contains a first insulation unit having a primary side and a secondary side that are insulated from each other. The first insulation unit outputs a signal containing information of at least one cell to a communication line. The signal is referenced to predetermined standard voltage between a voltage at one end and a voltage at the other end of the plurality of power storage modules. The management device contains a second insulation unit having a primary side and a secondary side that are insulated from each other, and a circuit unit insulated from the communication line by the second insulation unit.

10 Claims, 2 Drawing Sheets

(51) Int. Cl.
*H01M 10/48* (2006.01)
*H02J 7/00* (2006.01)
*H02J 7/02* (2016.01)
*H02J 13/00* (2006.01)

(52) U.S. Cl.
CPC ......... *H01M 10/482* (2013.01); *H02J 7/0021* (2013.01); *H02J 7/02* (2013.01); *H02J 13/00* (2013.01)

(56) References Cited

U.S. PATENT DOCUMENTS

| | | | |
|---|---|---|---|
| 2017/0229902 A1* | 8/2017 | Kamikawa | H02J 7/0014 |
| 2017/0279161 A1* | 9/2017 | Kamikawa | H02J 7/0021 |
| 2017/0373520 A1* | 12/2017 | Sugeno | H02J 7/0018 |

* cited by examiner

POWER STORAGE SYSTEM

CROSS-REFERENCE TO RELATED APPLICATIONS

This application is a U.S. national stage application of the PCT International Application No. PCT/JP2017/029701 filed on Aug. 21, 2017, which claims the benefit of foreign priority of Japanese patent application 2016-166216 filed on Aug. 26, 2016, the contents all of which are incorporated herein by reference.

TECHNICAL FIELD

The present invention relates to a power storage system including a plurality of power storage modules connected in series.

BACKGROUND ART

A conventionally known power storage system includes a plurality of power storage modules connected in series and a management device that manages the power storage modules. In each of the power storage modules, a communication unit communicating with the management device is electrically insulated from a battery cell by an insulation element. A withstand voltage of the insulation element needs to be set to about a both-ends voltage (that is also referred to as a system voltage) of the power storage modules connected in series. Therefore, when the system voltage is high, a special insulation element with the high withstand voltage needs to be used instead of a typical insulation element.

PTL 1 discloses a battery system including a plurality of assembled batteries connected in series, each of the assembled batteries containing an insulation interface and a controller. The controller of each of the assembled batteries communicates with the high rank assembled battery or the low rank assembled battery through the insulation interface. A lowest rank assembled battery communicates with an integrated controller through the insulation interface. According to the above structure, since a withstand voltage of each of the insulation interfaces may be about a voltage of each of the assembled batteries, the typical insulation element can be used as the insulation interface.

CITATION LIST

Patent Literature

PTL 1: Unexamined Japanese Patent Publication No. 2011-259545

SUMMARY OF THE INVENTION

According to the battery system disclosed in PTL 1, since each communication is executed through a plurality of the insulation interfaces, communication delay increases. Therefore, communication cycle lengthens.

In consideration of such circumstances, it is an object of the present invention to provide a technique of reducing a withstand voltage of an insulation element as well as restraining communication delay from increasing.

To solve the problem mentioned above, according to an aspect of the present invention, a power storage system includes a plurality of power storage modules, each containing at least one cell, that are connected in series, and a management device that manages the plurality of power storage modules. Each of the plurality of power storage modules includes a first insulation unit containing a primary side and a secondary side that are insulated from each other, the first insulation unit outputting a signal containing information of the at least one cell to a communication line, the signal being referenced to a predetermined standard voltage between a voltage at one end and a voltage at the other end of the plurality of power storage modules. The management device includes a second insulation unit containing a primary side and a secondary side that are insulated from each other and a circuit unit insulated from the communication line by the second insulation unit.

According to the present invention, it is possible to reduce a withstand voltage of an insulation element and to restrain communication delay from increasing.

DESCRIPTION OF EMBODIMENTS

First Exemplary Embodiment

Figure 1:
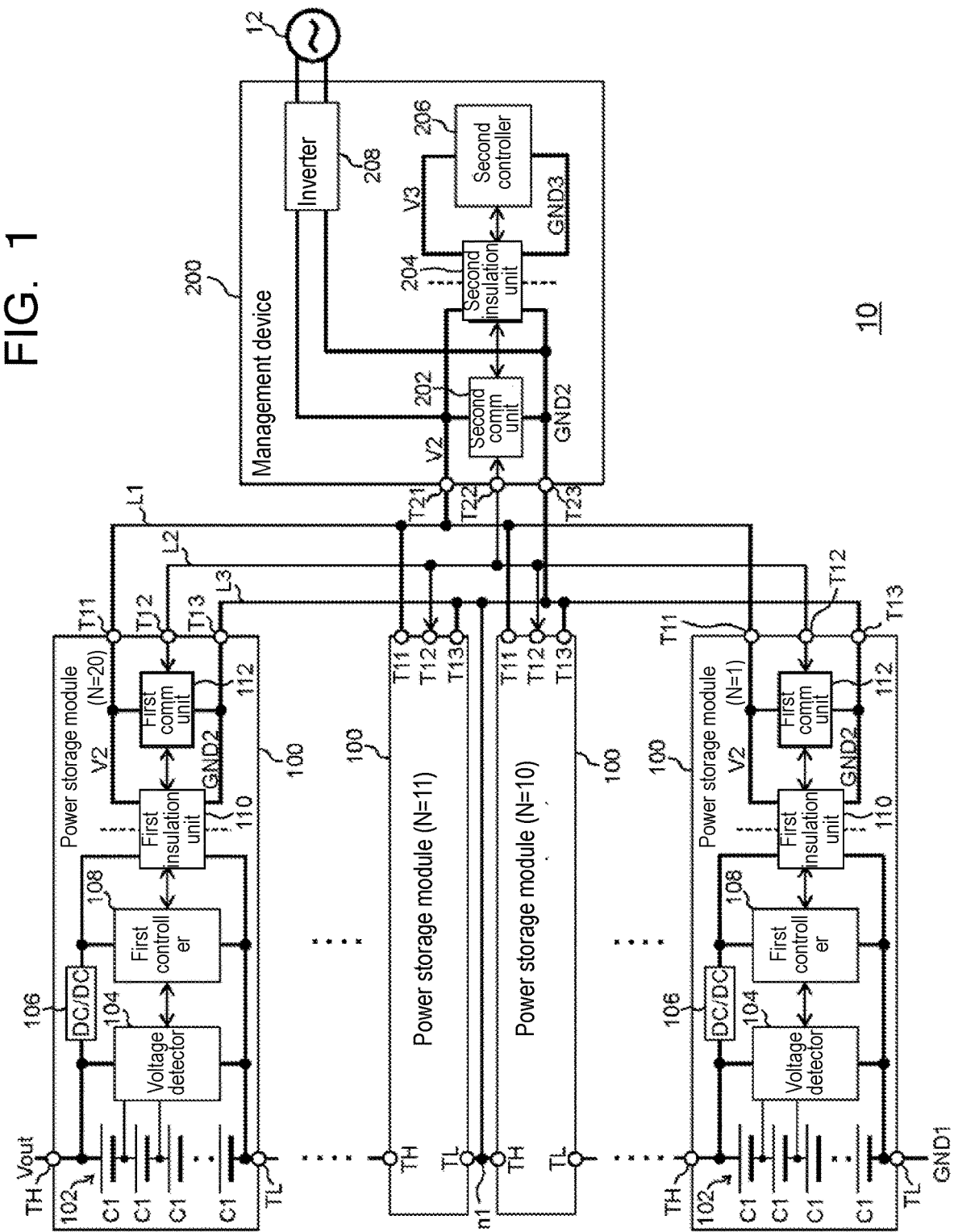
FIG. 1 is a block diagram illustrating a configuration of a power storage system according to a first exemplary embodiment.

FIG. 1 is a block diagram illustrating a configuration of power storage system 10 according to a first exemplary embodiment. Power storage system 10 includes a plurality of power storage modules 100 and management device 200.

The plurality of power storage modules 100 are connected in series. According to the exemplary embodiment, although an example in which 20 power storage modules 100 are connected in series will be described, a number of power storage modules 100 is not limited. From a lowest rank power storage module 100 of a lowest voltage side toward a highest rank power storage module 100 of a highest voltage side, power storage modules 100 are referred to as also "power storage module 100 of N=1" to "power storage module 100 of N=20".

Since the plurality of power storage modules 100 have the same structures each other, a description as to power storage module 100 of N=20 will be made hereinafter. Power storage module 100 includes assembled battery 102, voltage detector 104, DC-DC converter 106, first controller 108, first insulation unit 110, first communication unit 112, high voltage terminal TH, low voltage terminal TL, power source terminal T11, communication terminal T12, and standard voltage terminal T13.

Assembled battery 102 has a plurality of battery cells C1 that are connected in series and each of which is a chargeable and dischargeable secondary battery. In order to configure assembled battery 102, a predetermined number of battery cells in the plurality of battery cells C1 may be coupled in parallel each other to form a parallel connection, and a predetermined number of the parallel connections may be further coupled in series each other. A type of battery cell C1 may be a lithium ion battery, a nickel hydrogen battery, or the like.

A high voltage side node of assembled battery 102 is connected to high voltage terminal TH. A low voltage side node of assembled battery 102 is connected to low voltage terminal TL. Voltage of assembled battery 102, that is, potential difference between voltages of high voltage terminal TH and low voltage terminal TL, is also referred to as a module voltage. The module voltage is assumed to be 50 V here, that is not especially limited.

Voltage detector 104 detects each of cell voltages of battery cells C1 of assembled battery 102 to output each cell voltage to first controller 108. Voltage detector 104 operates with the potential difference between voltages of low voltage terminal TL and high voltage terminal TH as a power source voltage.

DC-DC converter 106 steps down the voltage of high voltage terminal TH to supply a step-down voltage to first controller 108 and first insulation unit 110.

First controller 108 controls operation of voltage detector 104 to convert cell voltage data output from voltage detector 104 into data suitable for processing by management device 200 and to determine state of charge (SOC) of assembled battery 102. First controller 108 outputs signals each containing data of battery cell C1 to first insulation unit 110. First controller 108 operates with potential difference between the step-down voltage formed by DC-DC converter 106 and the voltage of low voltage terminal TL as a power source voltage. First controller 108 is composed of a central processing unit (CPU), a logic circuit, or a combination of the CPU and the logic circuit.

First insulation unit 110, whose primary side and secondary side are configured to be electrically insulated from each other, transmits signals in both directions between first controller 108 and first communication unit 112. That is, first insulation unit 110 outputs the signals each containing the information of battery cell C1 to first communication unit 112. First insulation unit 110 contains at least one insulation element, for example, a digital isolator in which a primary side and a secondary side are magnetically coupled to each other to transmit signals, or an opt-insulated type photocoupler that includes a photodiode on the primary side and a phototransistor on the secondary side is used, as the insulation element.

To first insulation unit 110, the step-down voltage formed by DC-DC converter 106, the voltage of low voltage terminal TL, power source voltage V2 of power source terminal T11, and standard voltage GND2 of standard voltage terminal T13 are supplied. Standard voltage GND2 is a predetermined voltage between high side voltage Vout at one end and low side voltage GND1 at the other end of the plurality of power storage modules 100. That is, standard voltage GND2 is higher than low side voltage GND1 and lower than high side voltage Vout. Power source voltage V2 is higher than standard voltage GND2 by a predetermined voltage. Each of the signals between first insulation unit 110 and first controller 108 sets the step-down voltage formed by DC-DC converter 106 as a high level and the voltage of low voltage terminal TL as a low level. Each of the signals between first insulation unit 110 and first communication unit 112 sets power source voltage V2 as a high level and standard voltage GND2 as a low level. Namely, each of the signals between first insulation unit 110 and first communication unit 112 is the signal referenced to standard voltage GND2. First insulation unit 110 converts signal levels as described above.

First communication unit 112 communicates with second communication unit 202 of management device 200 described later. First communication unit 112 sends the signals, supplied from first insulation unit 110, to second communication unit 202 through communication terminal T12, and receives signals, sent from second communication unit 202, through communication terminal T12 to output the received signals to first insulation unit 110.

First communication unit 112 operates with potential difference between standard voltage GND2 and power source voltage V2 as a power source voltage. Each of the signals transmitted between first communication unit 112 and second communication unit 202 is also the signal referenced to standard voltage GND2, and sets power source voltage V2 as the high level and standard voltage GND2 as the low level.

High voltage terminal TH of each of power storage modules 100 of N=1 to N=19 is connected to low voltage terminal TL of one higher power storage module 100. Thereby, a plurality of assembled batteries 102 are connected in series. High voltage terminal TH of power storage module 100 of N=20 is one end of the plurality of power storage modules 100, so that a voltage of high voltage terminal TH of power storage module 100 of N=20 is high side voltage Vout. Low voltage terminal TL of power storage module 100 of N=1 is the other end of the plurality of power storage modules 100, so that a voltage of low voltage terminal TL of power storage module 100 of N=1 is low side voltage GND1. High side voltage Vout and low side voltage GND1 are supplied to a power conditioner not shown. A both-ends voltage of the plurality of power storage modules 100, that is, potential difference between high side voltage Vout and low side voltage GND1 is referred to as also a system voltage. According to the exemplary embodiment, the system voltage is 1000 V.

Power source terminals T11 of the plurality of power storage modules 100 are connected to power source terminal T21 of management device 200 described later through power line L1, so that power source voltage V2 is supplied from management device 200. Communication terminals T12 of the plurality of power storage modules 100 are connected to communication terminal T22 of management device 200 described later through communication line L2. As standard voltage terminals T13 of the plurality of power storage modules 100 are connected to standard voltage terminal T23 of management device 200 described later through power line L3, standard voltage terminals T13 are connected to node n1 between a predetermined pair of power storage modules 100 that are adjacent to each other, so that standard voltage GND2 is supplied from node n1. The predetermined pair of power storage modules 100 that are adjacent to each other are power storage module 100 of N=10 and power storage module 100 of N=11 here. Hence, standard voltage GND2 is a midpoint voltage between high side voltage Vout and low side voltage GND1. The midpoint voltage between high side voltage Vout and low side voltage GND1 is one half of the sum of high side voltage Vout and low side voltage GND1. For example, when high side voltage Vout is 1000 V and low side voltage GND1 is 0 V, standard voltage GND2 is 500 V.

Management device 200 manages the plurality of power storage modules 100. Management device 200 includes second communication unit 202, second insulation unit 204, second controller (circuit unit) 206, inverter (power source circuit) 208, power source terminal T21, communication terminal T22, and standard voltage terminal T23.

Second communication unit 202 receives the signals, sent from first communication unit 112 of each of power storage modules 100, through communication terminal T22 to output the received signals to second insulation unit 204. Further, second communication unit 202 sends signals, supplied from second insulation unit 204, through communication terminal T22 to first communication unit 112 of each of power storage modules 100. Second communication unit 202 operates with the potential difference between standard voltage GND2 of standard voltage terminal T23 and power source voltage V2 of power source terminal T21 as a power source voltage.

Second insulation unit 204, whose primary side and secondary side are configured to be electrically insulated from each other, insulates between second communication unit 202 and second controller 206, and transmits signals in both directions between second communication unit 202 and second controller 206. That is, into second insulation unit 204, signals on communication line L2 are input through second communication unit 202. Second insulation unit 204 contains at least one insulation element, for example like first insulation unit 110, the digital isolator or the opt-insulated type photo-coupler is used as the insulation element.

To second insulation unit 204, power source voltage V2, standard voltage GND2, power source voltage V3, and standard voltage GND3 are supplied. Standard voltage GND3 and power source voltage V3 are supplied from a power source circuit not shown. Each of the signals between second communication unit 202 and second insulation unit 204 sets power source voltage V2 as a high level and standard voltage GND2 as a low level. Each of the signals between second insulation unit 204 and second controller 206 sets power source voltage V3 as a high level and standard voltage GND3 as a low level. Second insulation unit 204 also converts signal levels as described above.

As described above, second controller 206 is insulated from communication line L2 by second insulation unit 204. Second controller 206 sends signals for controlling the plurality of power storage modules 100 through second communication unit 202 and second insulation unit 204, and receives data with respect to the cell voltage and SOC sent from first controllers 108 of the plurality of power storage modules 100. Second controller 206 sends signals with respect to a state of each power storage module 100 to an external controller not shown, based on the received data. The external controller controls the power conditioner connected to both ends of the plurality of power storage modules 100, based on the signals output from second controller 206. Thereby, charge and discharge of the plurality of power storage modules 100 are controlled. Second controller 206 is composed of a CPU, a logic circuit, or a combination of the CPU and the logic circuit. Second controller 206 operates with potential difference between standard voltage GND3 and power source voltage V3 as a power source voltage.

Inverter 208, that is an insulation type inverter, converts AC power of external AC power supply 12 into DC power to supply driving electric power to first insulation unit 110 and second insulation unit 204. As inverter 208 supplies power source voltage V2 referenced to standard voltage GND2 to second communication unit 202 and second insulation unit 204, inverter 208 supplies power source voltage V2 to first communication unit 112 and first insulation unit 110 through power source terminal T21. Namely, signal transmission between the plurality of power storage modules 100 and management device 200 is executed by electric power supply from inverter 208 inside management device 200. Since management device 200 has inverter 208, power source voltage V2 can be appropriately supplied.

Power source voltage V2 and standard voltage GND2 are electrically insulated from power source voltage V3 and standard voltage GND3. Also high side voltage Vout and low side voltage GND1 are electrically insulated from power source voltage V3 and standard voltage GND3. Since high side voltage Vout and low side voltage GND1 are electrically insulated from standard voltage GND3, high side voltage Vout and low side voltage GND1 can be varied from negative voltage to positive voltage according to a characteristic of the power conditioner connected thereto with standard voltage GND3 as 0 V.

A withstand voltage of first insulation unit 110 of each of power storage modules 100 will be described hereinafter. To first insulation unit 110 of power storage module 100 of N=20, for example, at most a voltage corresponding to about difference between standard voltage GND2 and the step-down voltage formed by DC-DC converter 106 is applied. It is assumed that the step-down voltage formed by DC-DC converter 106 is 955 V, about 455 V is applied to first insulation unit 110. Therefore, first insulation unit 110 needs to have a withstand voltage that is approximately not less than 455 V.

To first insulation unit 110 of power storage module 100 of N=1, at most a voltage corresponding to about difference between low side voltage GND1 and power source voltage V2 is applied. It is assumed that power source voltage V2 is 510 V, about 510 V is applied to first insulation unit 110. Therefore, first insulation unit 110 needs to have a withstand voltage that is approximately not less than 510 V. A voltage applied to first insulation unit 110 of each of other power storage modules 100 is lower than the voltage applied to first insulation unit 110 of power storage module 100 of N=1. Therefore, a withstand voltage of first insulation unit 110 of each of other power storage modules 100 may be also lower than this value.

As described above, since high side voltage Vout and low side voltage GND1 can be varied from the negative voltage to the positive voltage with standard voltage GND3 as 0 V, also power source voltage V2 and standard voltage GND2 can be varied. For that reason, a withstand voltage of second insulation unit 204 is one of a larger value between an absolute value of power source voltage V2 and an absolute value of standard voltage GND2.

As explained above, according to the present exemplary embodiment, first insulation unit 110 of each power storage module 100 outputs the signals referenced to standard voltage GND2 that is the midpoint voltage between high side voltage Vout and low side voltage GND1 to communication line L2 through first communication unit 112. Therefore, the withstand voltage of each first insulation unit 110 may be about one half (=500 V) of the system voltage that is the difference between high side voltage Vout and standard voltage GND2, namely, difference between low side voltage GND1 and standard voltage GND2. Therefore, since the withstand voltage of first insulation unit 110 can be more reduced than the system voltage (=1000 V), a typical insulation element as first insulation unit 110 can be used. Further, since standard voltage GND2 is the midpoint voltage, the withstand voltage of first insulation unit 110 can be approached to a minimum.

Furthermore, since first controller 108 of each power storage module 100 communicates with second controller 206 of management device 200 through first insulation unit 110 and second insulation unit 204 without the medium of multiple layers of first insulation units 110 of power storage modules 100, there is no probability of increasing communication delay. Therefore, information of the cell voltage and so on can be obtained in a shorter communication cycle relative to a conventional battery system in which a controller of each assembled battery communicates with the high rank assembled battery or the low rank assembled battery through the insulation interface. Consequently, when the cell voltage is measured multiple times, the cell voltages can be measured in a short time to reduce variation of each cell voltage due to measurement time relative to the conventional battery system.

Therefore, it is possible to reduce the withstand voltage of first insulation unit 110 as well as restraining communication delay from increasing.

Second Exemplary Embodiment

A second exemplary embodiment is different from the first exemplary embodiment in that standard voltage GND2 is formed by a voltage division circuit. The points different from the first exemplary embodiment will be mainly described hereinafter.

Figure 2:
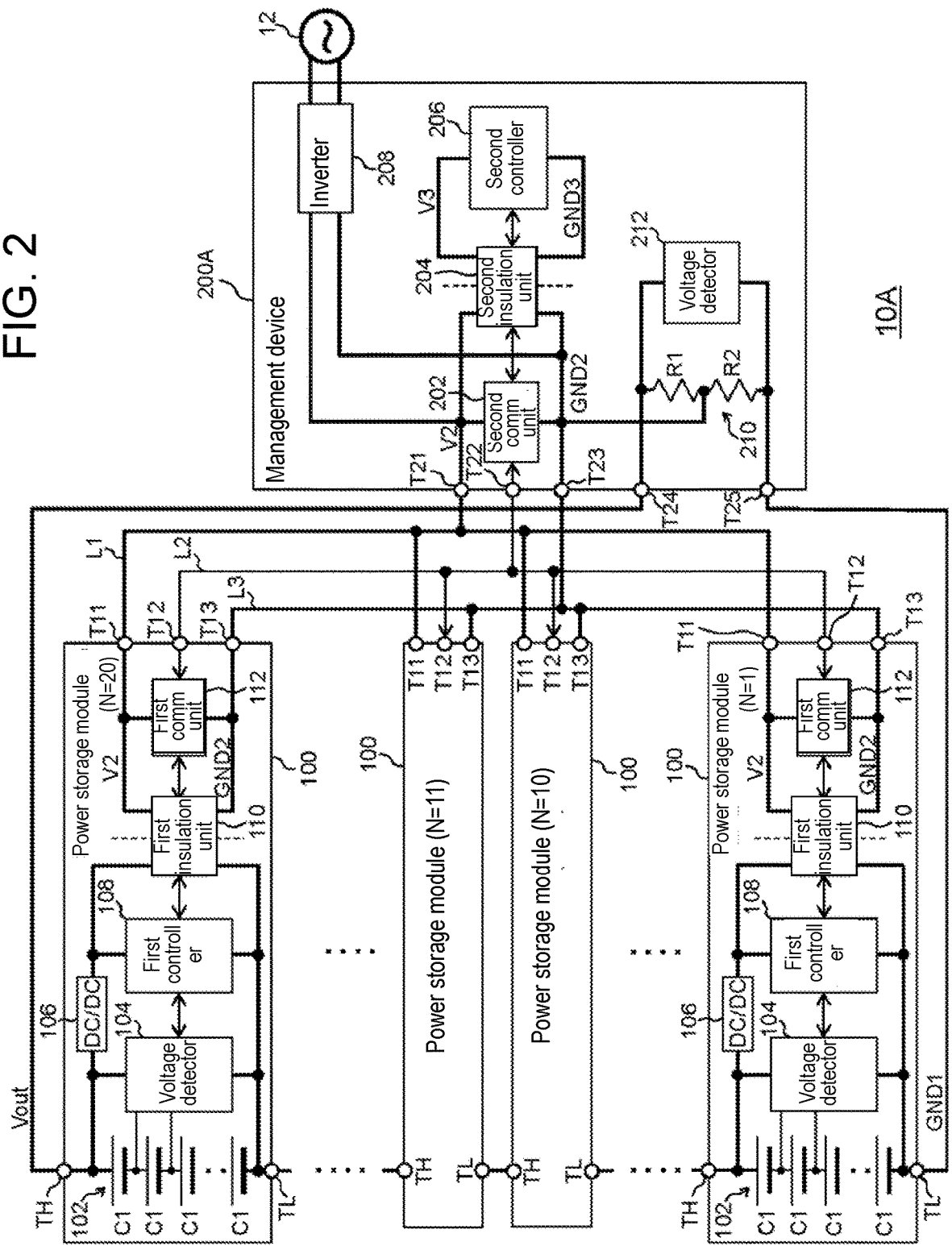
FIG. 2 is a block diagram illustrating a configuration of a power storage system according to a second exemplary embodiment.

FIG. 2 is a block diagram illustrating a configuration of power storage system 10A according to a second exemplary embodiment. In power storage system 10A, the node between power storage module 100 of N=10 and power storage module 100 of N=11 is not connected to standard voltage terminal T13 as shown in FIG. 2. Then, management device 200A further includes voltage division circuit 210, voltage detector 212, terminal T24, and terminal T25 in addition to the structure shown in FIG. 1.

Voltage division circuit 210 divides the both-ends voltage of the plurality of power storage modules 100 to output standard voltage GND2. Voltage division circuit 210 has resistance R1 and resistance R2. One end of resistance R1 is connected to high voltage terminal TH of power storage module 100 of N=20 through terminal T24. The other end of resistance R1 is connected to one end of resistance R2 and standard voltage terminal T23 to output standard voltage GND2. The other end of resistance R2 is connected to low voltage terminal TL of power storage module 100 of N=1 through terminal T25.

A value of resistance R1 is set to be substantially equal to a value of resistance R2. Hence, standard voltage GND2 is the midpoint voltage between high side voltage Vout and low side voltage GND1 like the first exemplary embodiment.

Voltage detector 212 detects the both-ends voltage of the plurality of power storage modules 100. The detected both-ends voltage is supplied to second controller 206 through an insulation unit not shown. Second controller 206 controls the power conditioner based on the detected both-ends voltage.

According to the first exemplary embodiment, for example, the both-ends voltage of the plurality of power storage modules 100 can be calculated based on each of the cell voltages detected in the plurality of power storage modules 100. On the contrary, in the second exemplary embodiment, the both-ends voltage of the plurality of power storage modules 100 can be detected in a shorter time than the first exemplary embodiment. Thereby, the power conditioner can be more rapidly controlled.

Further, according to the present exemplary embodiment, since voltage division circuit 210 forms standard voltage GND2 based on high side voltage Vout and low side voltage GND1 supplied to voltage detector 212 of management device 200A, the power line need not be connected to the node between a pair of power storage modules 100 that are adjacent to each other. Furthermore, standard voltage GND2 can be easily set to an arbitrary value by voltage division circuit 210.

The present invention has been described based on the exemplary embodiments. A person of the ordinary skill in the art can understand that the exemplary embodiments are illustrative only, constitution elements and combined processes can be modified, and such modified examples are covered by the scope of the present invention.

According to the first exemplary embodiment, for example, an example in which standard voltage GND2 is the voltage of node n1 between power storage module 100 of N=10 and power storage module 100 of N=11, namely the midpoint voltage between high side voltage Vout and low side voltage GND1 has been described, but standard voltage GND2 is not limited the above. As long as standard voltage GND2 is a voltage between high side voltage Vout and low side voltage GND1 and the withstand voltage of first insulation unit 110 becomes a desired value, standard voltage GND2 may be higher or lower than the midpoint voltage between high side voltage Vout and low side voltage GND1. Since the withstand voltage of second insulation unit 204 is one of about the larger value between the absolute value of power source voltage V2 and the absolute value of standard voltage GND2 as described above, the withstand voltage of second insulation unit 204 sometimes can be reduced by setting standard voltage GND2 to a voltage other than the midpoint voltage according to the characteristic of the power conditioner. The above-mentioned matters are applicable to the second exemplary embodiment and the value of resistance R1 may not be equal to the value of resistance R2.

Further, battery cell C1 may be a capacitor (condenser), such as an electric double layer capacitor or lithium-ion capacitor.

The exemplary embodiment may be identified with items described below.

[Item 1]

Power storage system (10, 10A) including:

a plurality of power storage modules (100) each of which contains at least one cell (C1) and that are connected in series; and management device (200, 200A) that manages the plurality of power storage modules (100), wherein each of the plurality of power storage modules (100) includes first insulation unit (110) containing a primary side and a secondary side that are insulated from each other, first insulation unit (110) outputting a signal containing information of at least one cell (C1) to communication line (L2), the signal being referenced to standard voltage (GND2) predetermined between voltage (Vout) at one end and voltage (GND1) at the other end of the plurality of power storage modules (100), and management device (200, 200A) includes a second insulation unit (204) containing a primary side and a secondary side that are insulated from each other, and circuit unit (206) insulated from the communication line (L2) by second insulation unit (204).

According to Item 1, it is possible to reduce a withstand voltage of first insulation unit (110) as well as restraining communication delay from increasing.

[Item 2]

In power storage system (10) according to item 1, wherein standard voltage (GND2) is a voltage of node (n1) between a predetermined pair of power storage modules (100) that are adjacent to each other.

According to Item 2, standard voltage (GND2) can be obtained with a simple structure.

[Item 3]

In power storage system (10A) according to item 1, wherein management device (200A) includes voltage division circuit (210) that divides a both-ends voltage of the plurality of power storage modules (100) to output standard voltage (GND2).

According to Item 3, standard voltage (GND2) can be easily set to an arbitrary value.

[Item 4]

In power storage system (10, 10A) according to any of items 1 to 3, wherein standard voltage (GND2) is a midpoint voltage between voltage (Vout) at the one end and voltage (GND1) at the other end of the plurality of power storage modules (100).

According to Item 4, the withstand voltage of first insulation unit (110) can be approached to a minimum.

[Item 5]

In power storage system (10, 10A) according to any of items 1 to 4, wherein management device (200, 200A) includes power source circuit (208) that supplies driving electric power to first insulation unit (110) and second insulation unit (204), and signal transmission between the plurality of power storage modules (100) and management device (200, 200A) is executed by electric power supplied from power source circuit (208).

According to Item 5, power source voltage (V2) can be appropriately supplied.

The invention claimed is:

1. A power storage system comprising:
a plurality of power storage modules each of which includes at least one cell and that are connected in series; and
a management device that manages the plurality of power storage modules, wherein
each of the plurality of power storage modules includes a first insulation unit containing a primary side and a secondary side that are insulated from each other, a first communication unit outputting a signal containing information of the at least one cell to a communication line, the first insulation unit insulating the first communication unit from the at least one cell, and
the management device includes a second communication unit communicating with the first communication unit, a second insulation unit containing a primary side and a secondary side that are insulated from each other, and a circuit unit insulated from the communication line by the second insulation unit, and
wherein reference voltages of each of the first communication unit and the second communication unit are generated by a voltage generated by the plurality of power storage modules and the reference voltages are set to a voltage predetermined between a voltage at one end and a voltage at the other end of the plurality of power storage modules.

2. The power storage system according to claim 1, wherein the reference voltage is a voltage of a node between a predetermined pair of power storage modules that are adjacent to each other.

3. The power storage system according to claim 2, wherein the reference voltage is a midpoint voltage between the voltage at the one end and the voltage at the other end of the plurality of power storage modules.

4. The power storage system according to claim 2, wherein
the management device includes a power source circuit that supplies driving electric power to the first insulation unit and the second insulation unit, and
signal transmission between the plurality of power storage modules and the management device is executed by electric power supplied from the power source circuit.

5. The power storage system according to claim 1, wherein the management device includes a voltage division circuit that divides a both-ends voltage of the plurality of power storage modules to output the reference voltage.

6. The power storage system according to claim 5, wherein the reference voltage is a midpoint voltage between the voltage at the one end and the voltage at the other end of the plurality of power storage modules.

7. The power storage system according to claim 5, wherein
the management device includes a power source circuit that supplies driving electric power to the first insulation unit and the second insulation unit, and
signal transmission between the plurality of power storage modules and the management device is executed by electric power supplied from the power source circuit.

8. The power storage system according to claim 1, wherein
the reference voltage is a midpoint voltage between the voltage at the one end and the voltage at the other end of the plurality of power storage modules.

9. The power storage system according to claim 8, wherein
the management device includes a power source circuit that supplies driving electric power to the first insulation unit and the second insulation unit, and
signal transmission between the plurality of power storage modules and the management device is executed by electric power supplied from the power source circuit.

10. The power storage system according to claim 1, wherein
the management device includes a power source circuit that supplies driving electric power to the first insulation unit and the second insulation unit, and
signal transmission between the plurality of power storage modules and the management device is executed by electric power supplied from the power source circuit.

* * * * *